United States Patent [19]

Imamura

[11] Patent Number: 5,560,014
[45] Date of Patent: Sep. 24, 1996

[54] DYNAMIC OBJECT MANAGEMENT METHOD IN OBJECT ORIENTED LANGUAGE

[75] Inventor: Satoshi Imamura, Tsuchiura, Japan

[73] Assignees: Agency of Industrial Science & Technology; Ministry of International Trade & Industry, both of Tokyo, Japan

[21] Appl. No.: 410,750

[22] Filed: Mar. 27, 1995

[30] Foreign Application Priority Data

Jun. 2, 1994 [JP] Japan .................................. 6-121081

[51] Int. Cl.$^6$ .................................................. G06F 9/44
[52] U.S. Cl. .................... 395/700; 364/DIG. 1; 364/280; 364/280.4
[58] Field of Search .................................. 395/600, 650, 395/700

[56] References Cited

U.S. PATENT DOCUMENTS

| | | | |
|---|---|---|---|
| 5,261,098 | 11/1993 | Katin et al. | 395/650 |
| 5,315,709 | 5/1994 | Alston, Jr. et al. | 395/600 |
| 5,339,430 | 8/1994 | Lundin et al. | 395/700 |
| 5,339,438 | 8/1994 | Conner et al. | 395/700 |
| 5,379,431 | 1/1995 | Lemon et al. | 395/700 |
| 5,386,568 | 1/1995 | Wold et al. | 395/700 |
| 5,418,964 | 5/1995 | Conner et al. | 395/700 |
| 5,418,966 | 5/1995 | Madduri | 395/725 |

OTHER PUBLICATIONS

Jay Banerjee et al., "Data Model Issues for Object–Oriented Applications," ACM Transactions on Office Information Systems, vol. 5, No. 1, Jan. 1987, pp. 3–26.

John V. Joseph et al., "Object–Oriented Databases: Design and Implementation," Proceedings of the IEEE, vol. 29, No. 1, Jan. 1991, pp. 42–64.

Primary Examiner—Paul V. Kulik
Attorney, Agent, or Firm—Oblon, Spivak, McClelland, Maier & Neustadt, P.C.

[57] ABSTRACT

In an object oriented language, a class object is modified by using meta operators to create a floating class object by copying from a class object, modifying the floating class object into a new class object and link the new class object with its original class object by a linking describing both the history of the modification and the relationship between the new class object and the original class object, and an instance object is modified by using meta operators to create a floating instance object by modifying the existing instance object and linking the modified instance object with its original class object by a link describing the modification and the relationship between modified instance object and the original class object.

6 Claims, 4 Drawing Sheets create_floating_class(E',E)

was(E',E,[])

DYNAMIC OBJECT MANAGEMENT METHOD IN OBJECT ORIENTED LANGUAGE

BACKGROUND OF THE INVENTION

1. Field of the Invention

This invention relates to a method for managing dynamic modification of class object and instance object definitions in an object oriented language.

2. Description of the Prior Art

In an object oriented language, programs are written in units called objects. The objects are autonomous, units which describe data and procedures in an integrated manner. The program as a whole performs tasks by message passing among the objects. A procedure which is activated by receipt of a message is called a method. An object can be requested to perform a task only through a method and data within the object cannot be directly accessed.

An arbitrary number of locations, called slots, can be defined in an object for storing data. Each slot is given a name. A slot can store integer, real number, string and other arbitrary data and can also store another object. One type of object is the class object and another is the instance object. Instance objects are created from a class object.

A sub class object inherits properties from a super class object. In class inheritance, both the slots and methods are inherited. Because of this, the relationship between super and sub objects is such that the slots and methods usable by a super object are also usable in its sub object.

The inheritance relationships between classes are referred to as 'a kind of' or is_a relations and by this relationship class objects compose a hierarchical structure.

Like ordinary compiler languages, however, object oriented languages of this type generally do not allow program (class object and instance object) definitions to be modified at the run time stage and, therefore, have drawbacks in terms of program development and maintenance. Although some object oriented languages do allow class modifications, they do not provide a basic solution to the problem.

This invention was accomplished in light of the foregoing problems of the prior art and aims at providing a dynamic object management method in an object oriented language, which enables program modifications to be made easily and to be made at the run time stage.

SUMMARY OF THE INVENTION

For achieving the aforesaid object, this invention provides an object oriented language having a hierarchy of class objects describing slots for storing data and methods consisting of groups of algorithms for conducting operations on the data and having instance objects associated with the individual class objects, the dynamic object management method being characterized in that the object oriented language is provided with a group of meta operations for modifying the class objects and the instance objects, a class object modification is conducted by using the group of meta operations to obtain a floating class object that is a copy of the class object, create a new class object by modifying the floating class object, and link the new class object with the original class object by a link describing the modification history of the floating class object, and an instance object modification is conducted by using the group of meta operations to obtain a floating instance object that is created by modifying an instance object, and linking the new instance object with its original class object by a link describing the modification history of the relationship between the new instance object and the class object.

The relationship between the modified floating instance object and its original class object is defined as a 'was_a' relation and the difference from an 'is_a' relation is expressed by the history of the meta operators applied to the floating instance. This enables modification of an instance object without disturbing the 'is_a' relation. In addition, a floating class object is created from a class object as a copy thereof so as to have a 'was' relation therewith. When a class object has a 'was' relation with its original class object, the modification history is recorded in the 'was' link and the effect thereof extends to instance object that inherit it.

The above and other objects, characteristic features and advantages of this invention will become apparent to those skilled in the art from the description of the invention given hereinbelow with reference to the accompanying drawings.

DESCRIPTION OF THE PREFERRED EMBODIMENT

Figure 1:
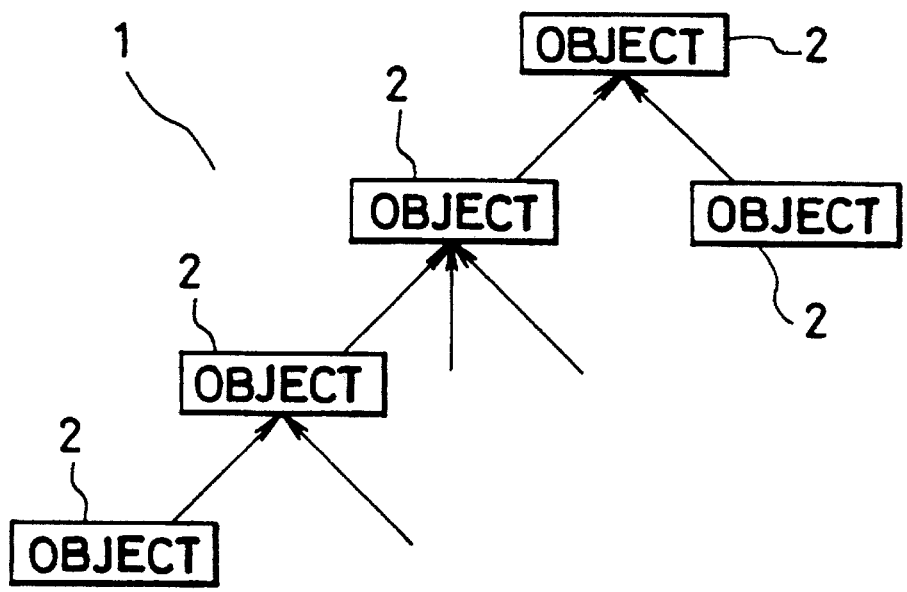
FIG. 1 is a diagram for explaining a program structure of an object oriented language.
Figure 2:
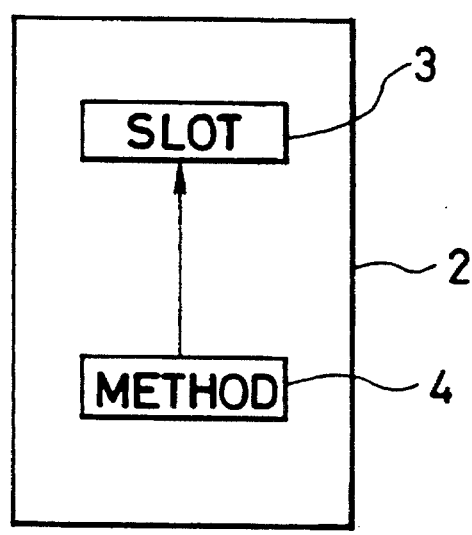
FIG. 2 is a diagram for explaining the structure of an object.

The details of the invention will now be explained with reference to an embodiment shown in the drawings based on the use of FDL (Formal Engineering Design Language) as an example. FIG. 1 shows the structure of a program 1 expressed in an object oriented language. The basic units of the program 1 are objects 2 which, as shown in FIG. 2, each describes a slot 3 for storing data and a method 4 consisting of a group of algorithms for performing operations on the data. The method 4 includes meta operations, which are operations for modifying the fundamental mechanism of the language. The meta operations dynamically modify the data structure, the methods and the inheritance relationship.

In the case of a logic type object oriented language, for example, the meta operations might include the following.

(1) merge (Inst1, Inst2)
(2) swap (Inst1, Inst2)
(3) create_floating_class (Obj, Floating Class)
(4) create_settled_class (Floating Class, Class)
(5) create_slot (Obj, Slot, Position, Slot, Contents)
(6) delete_slot (Obj, Slot)
(7) create_method (Obj, Method)
(8) delete_method (Obj, Method)
(9) create_local_predicate (Obj, Predicate)
(10) delete_local_predicate (Obj, Predicate)

'Obj' refers to the class object or instance object and 'Class' to the class object.

Structure merging (1) is a meta operation for creating an instance object corresponding to the union of the data structures and method definitions of two instance objects. Structure swapping (2) is a meta operation for replacing one instance object (Inst1) with another (Inst2). (3) is a meta operation for creating a floating class object from an ordinary class object or a floating instance object. Meta operations such as for slot or method addition/deletion are not allowed with respect to the ordinary class objects and are allowable only with respect to copies thereof called floating class objects and with respect to instance objects. When a floating class object is created from an ordinary class object, the inheritance relationships with already created instance objects are changed to the floating class object side. The floating class object concept is introduced to prevent destruction of the class hierarchy. (4) is a meta operation for creating a modified class object from a floating class object and deleting the floating class object. The inheritance relationships with already created instance objects are changed to the modified class object side. (5) and (6) are meta operations for adding/deleting slots and their contents to/from instance objects and floating class objects. Similarly, (7) and (8) are for adding/deleting methods and (9) and (10) for adding/deleting local descriptions. The result of operation (5), (6), (7), (8), (9) or (10) performed on a floating class object automatically extends to all instance objects which inherit it. A meta operation performed on an instance object has no effect on other objects.

Figure 3:
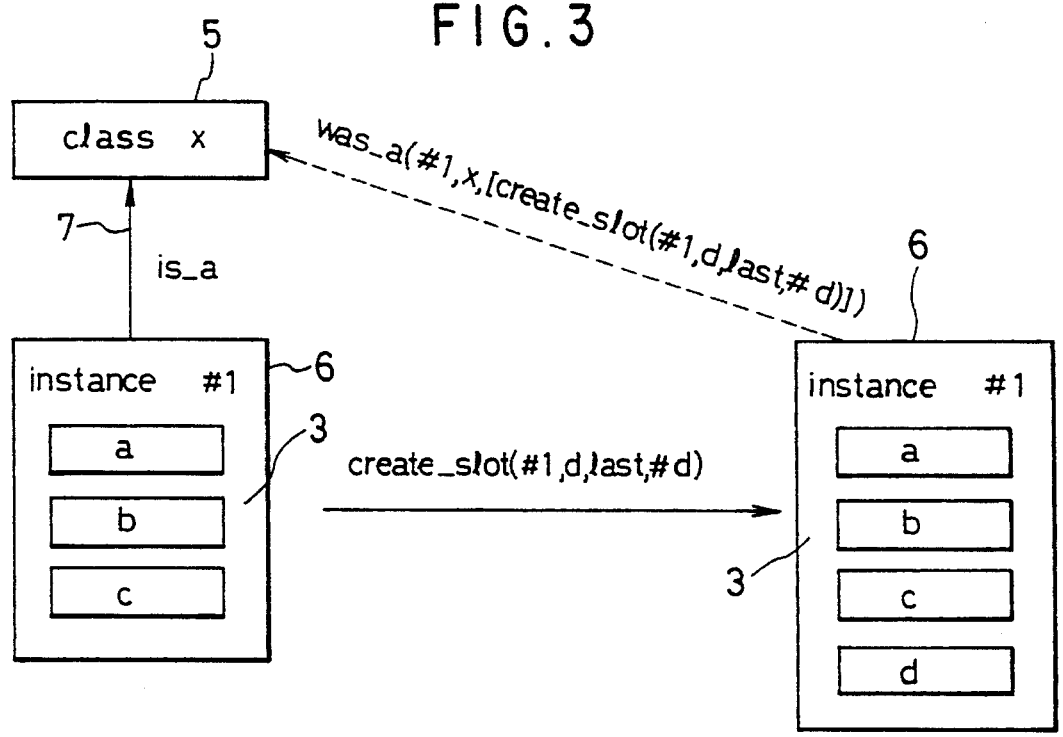
FIG. 3 is a diagram for explaining an operation for modifying an instance object.

As an example of addition/deletion and other modifications to an instance object 6 of the program 1, the management in the case of adding a slot will be explained with reference to FIG. 3. A class object 5 (class x) and the instance object 6 (instance #1) are connected by a link 7 representing an 'is_a' relation. Meta operation method 4 is used to add a slot to instance #1 (create_slot (#1, d, last, #d). This modifies instance object 6 to instance object 6' (instance #1). The link 7 connecting (class x) and the modified (instance #1) is defined as a 'was_a' relation and the modification history is written in the form (was_a (#1, x, [create_slot (#1, d, last, #d)])).

Figure 4:
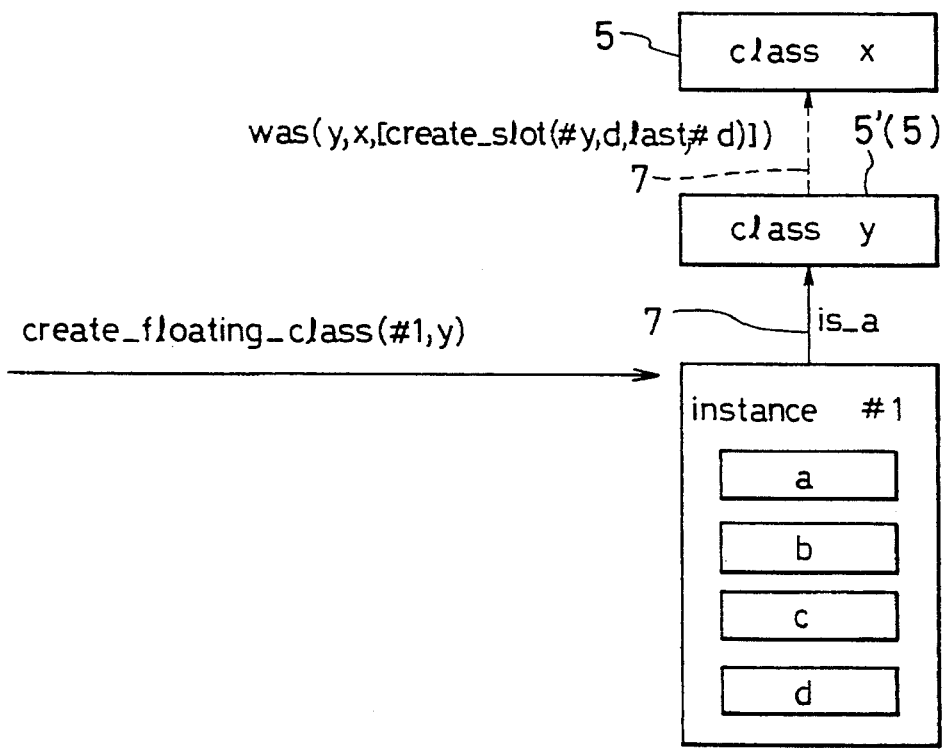
FIG. 4 is a diagram for explaining an operation for creating a floating class object from a floating instance object.

Next, the management in the case of creating a floating class object from a floating instance object will be explained with reference to FIG. 4. The creation of a floating class object for the instance object #1 is performed by executing the meta operation (create_floating_class (#1, y)). The result is a floating class object (class y). The link 7 connecting the original class object (class x) of the instance object #1 and the new (class y) is defined as a 'was' relation and the modification history is written in the form (was (x, y, [create___slot (#y, d, last, #d)])). At this time the relationship between (class y) and the associated instance object 6 (instance #1) is defined as an 'is_a' relation. The class object y inherits properties of the class x through 'was' relation. This 'was' inheritance is different from the ordinary 'is_a' inheritance in the point that the inheritance is controlled by the meta operation history.

Figure 5:
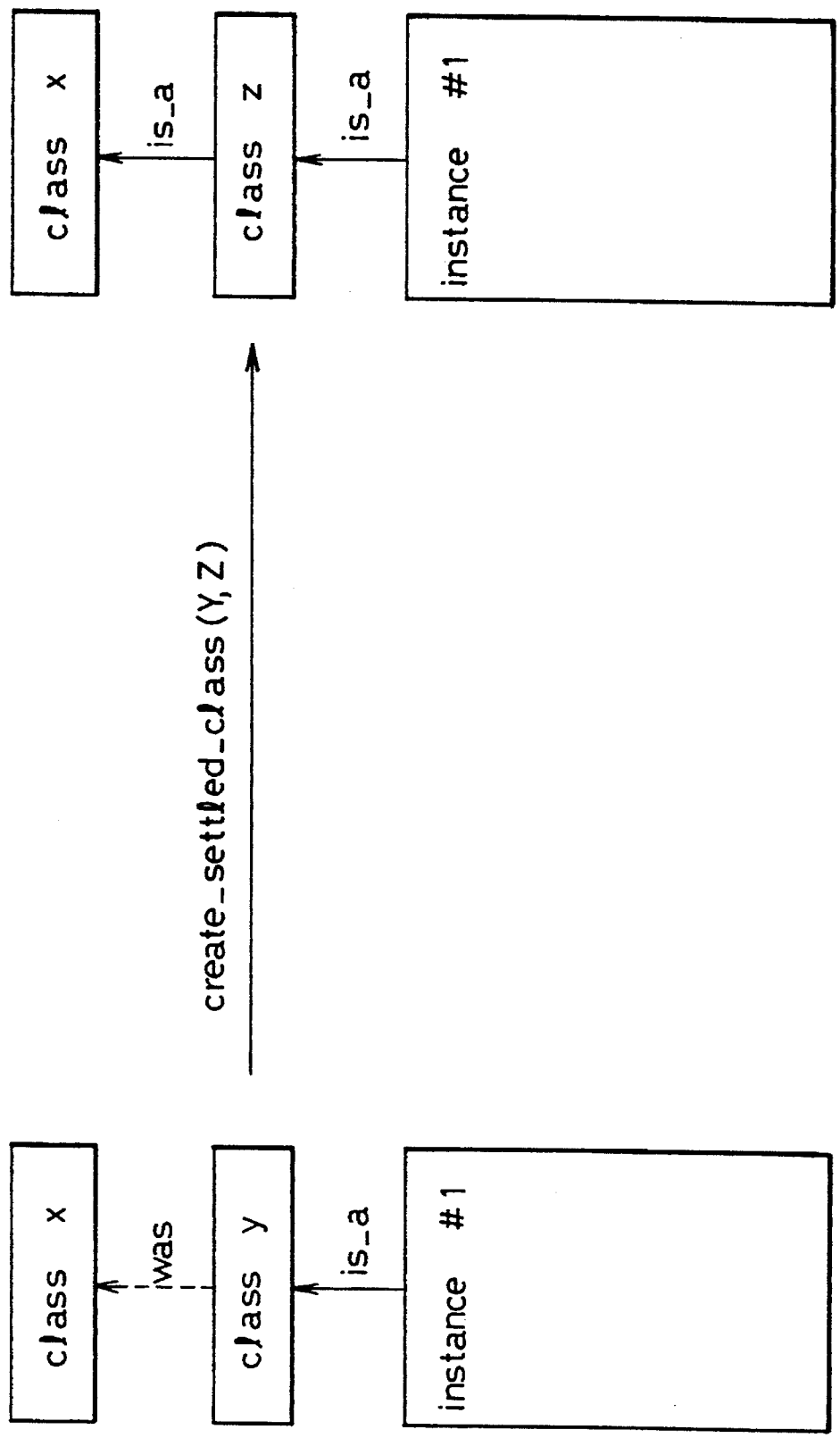
FIG. 5 is a diagram for explaining an operation for creating a settled class object.

The management in the case of modifying a floating class object to a class object will now be explained with reference to FIG. 5. When the meta operation (create_settled_class (y, z)) is performed on the floating class object y in FIG. 4, the floating class object y is transformed into class object z. The class object z has an 'is_a' relationship with the class object x which had a 'was' relation with the class y. The instance object #1 automatically takes an 'is_a' relation with the class object z. The definition of the class object z differs from the definition of the floating class object y in the point that it is simply described using the inheritance from the class object x.

Figure 6:
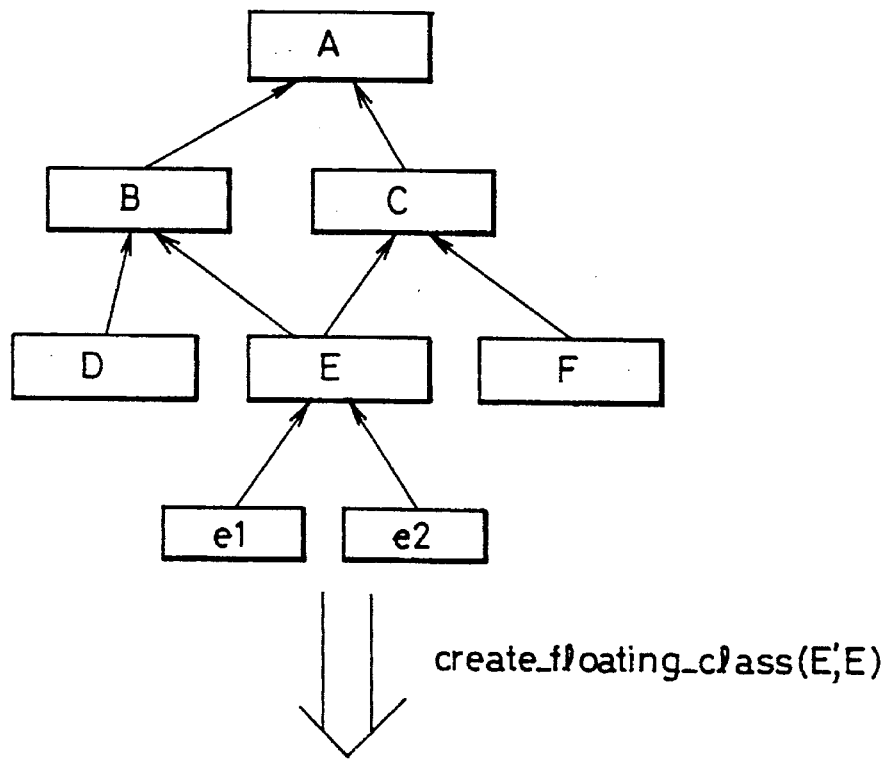
FIG. 6 is a diagram for explaining an operation for creating a floating class object from an ordinary class object.
Figure 6:
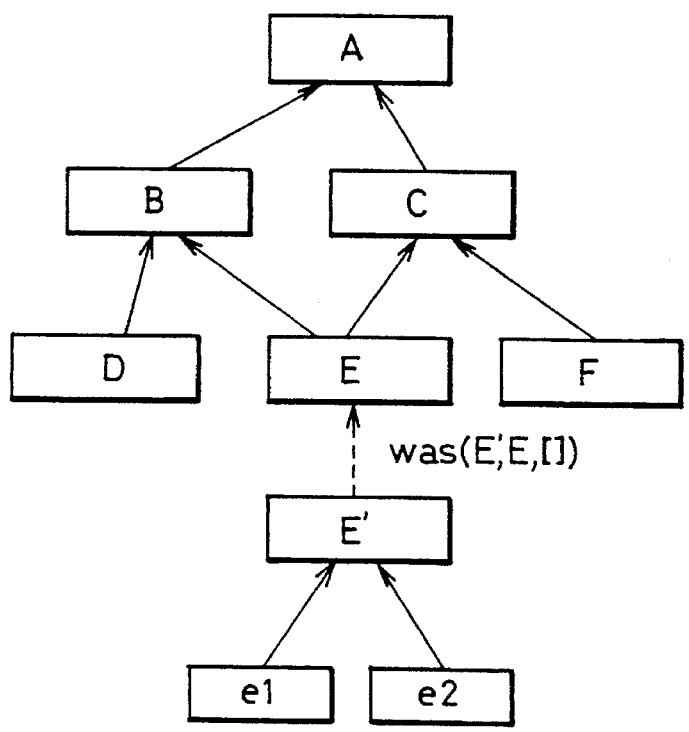

An explanation will now be given with reference to FIG. 6 regarding the management in the case of simultaneously modifying the same content of two instance objects 6 associated with a single object 2. When two instance objects (e1, e2) are to be simultaneously modified by the same content, the meta operation method 4 is used to copy the class object (E). (create_floating_class (E', E)). This creates the floating class object (E') of (E). The link between the original (E) and the new (E') is defined as 'was' and written as (was (E', E, [])). When the floating class object E' is thereafter modified by an operation such as addition/deletion of a slot/method, the effect of the modification extends to the instance objects (e1, e2) and the modification history is added to the 'was' link.

Thus a group of meta operations for dynamic modifications are introduced for enabling dynamic modification of class and instance objects in a object oriented language and a 'was_a' relation and a 'was' relation are introduced for managing the inheritance relationship (called the 'is_a' relation) between objects (class-class and class-instance) which is disrupted by dynamic modifications. Since these newly introduced relationships define the relationships between the modified instance and class objects and also define the relationships between class objects, the object modification history is written for clarifying the difference from an is_a relation. Thus by using the 'was_a' and 'was' relations for enabling modification of instance objects and by creating floating class objects, it becomes possible to modify class objects, create floating class objects from floating instance objects and create modified class objects from floating class objects, without affecting other classes.

What is claimed is:

1. A dynamic object management method in an object oriented language having a hierarchy of class objects describing slots for storing data and object methods consisting of groups of algorithms for conducting operations on the data and having instance objects associated with the individual class objects, the dynamic object management method comprising the steps of:

providing the object oriented language with a group of meta operators for modifying the class objects and the instance objects, and modifying an original class object according to the steps of obtaining a floating class object that is a copy of a class object by using the group of meta operators, creating a new class object by modifying the floating class object, and linking the new class object with the original class object by a link describing both a history of the modification and a relationship between the new class object and the original class object.

2. The method according to claim 1, wherein the modification and the relationship are expressed by using the group of meta operators.

3. A dynamic object management method in an object oriented language having a hierarchy of class objects describing slots for storing data and object methods consisting of groups of algorithms for conducting operations on the data and having instance objects associated with individual class objects, the dynamic object management method comprising the steps of:

providing the object oriented language with a group of meta operators for modifying the class objects and the instance objects, modifying an instance object related to a class object by using the group of meta operators to obtain a modified instance object, and linking the modified instance object with the related class object by a link describing both a history of the modification and a relationship between the modified instance object and the related class object.

4. The method according to claim 3, wherein the modification and the relationship are expressed by using the group of meta operators.

5. A dynamic object management method in an object oriented language having a hierarchy of class objects describing slots for storing data and object methods consisting of groups of algorithms for conducting operations on the data and having instance objects associated with the individual class objects, the dynamic object management method comprising the steps of:

providing the object oriented language with a group of meta operators for modifying the class objects and the instance objects, modifying an original class object using a first modification according to the steps of obtaining a floating class object that is a copy of a class object by using the group of meta operators, creating a new class object by modifying the floating class object, and linking the new class object with the original class object by a link describing both a history of the first modification and a first relationship between the new class object and the original class object, modifying an instance object related to the class object using a second modification by using the group of meta operators to obtain a modified instance object, and linking the modified instance object with the related class object by a link describing both a history of the second modification and a second relationship between the modified instance object and the related class object.

6. The method according to claim 5, wherein the first and second modifications and the first and second relationships are expressed by using the group of meta operators.

* * * * *

UNITED STATES PATENT AND TRADEMARK OFFICE
CERTIFICATE OF CORRECTION

PATENT NO. : 5,560,014
DATED      : September 24, 1996
INVENTOR(S): Satoshi IMAMURA It is certified that error appears in the above-indentified patent and that said Letters Patent is hereby corrected as shown below:

On the title page, Item [75], The Assignee should read:

-- [75] Agency of Industrial Science & Technology,
        Ministry of International Trade & Industry--

Signed and Sealed this

Twenty-sixth Day of November 1996

Attest:

BRUCE LEHMAN

Attesting Officer

Commissioner of Patents and Trademarks